Figure 1:
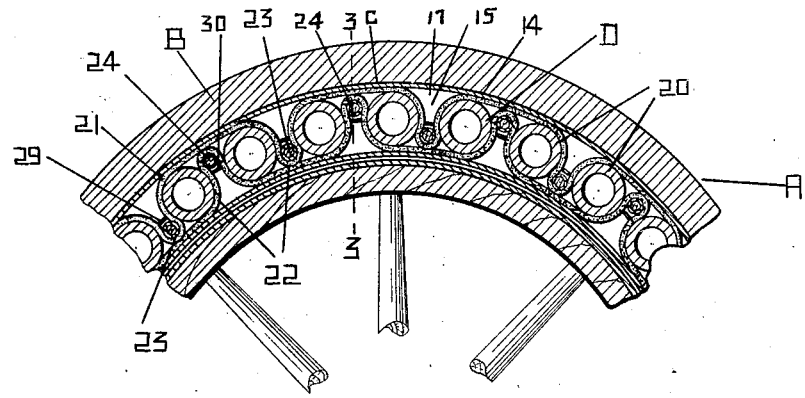

March 24, 1931.   G. H. YOUNG   1,797,538
AUTOMOBILE TIRE
Filed April 25, 1925   2 Sheets-Sheet 1

INVENTOR.
George H. Young
BY
ATTORNEY

March 24, 1931.   G. H. YOUNG   1,797,538
AUTOMOBILE TIRE
Filed April 25, 1925   2 Sheets-Sheet 2
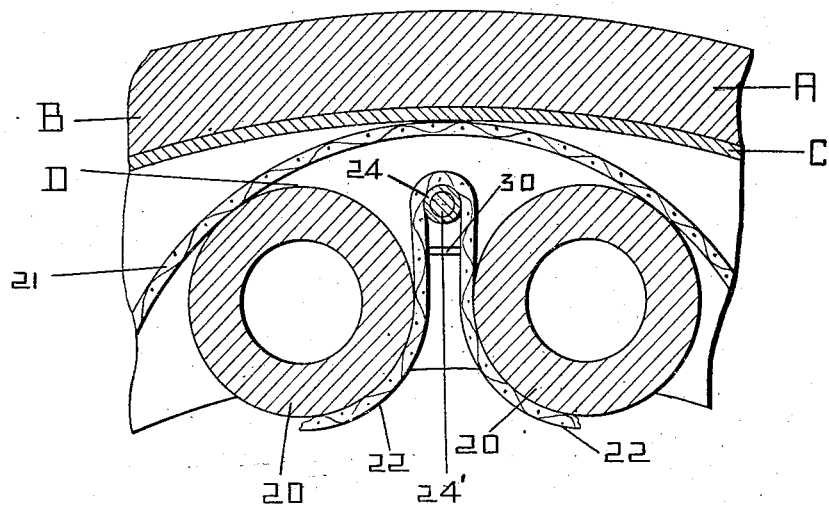
Fig. 4
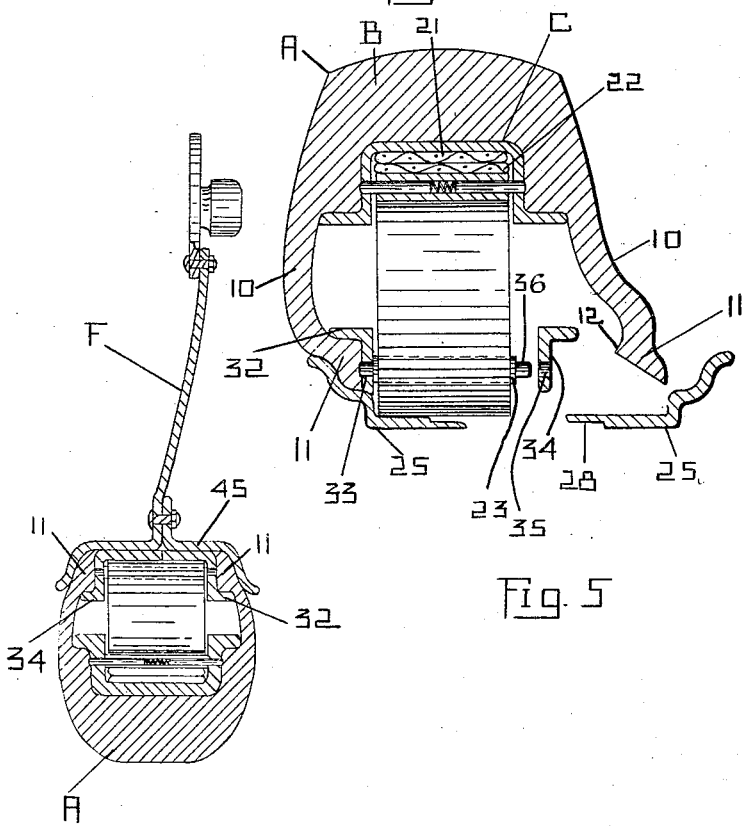
Fig. 5
Fig. 6
INVENTOR.
George H. Young
BY
ATTORNEY Patented Mar. 24, 1931

1,797,538

UNITED STATES PATENT OFFICE

GEORGE H. YOUNG, OF ST. PAUL, MINNESOTA

AUTOMOBILE TIRE

Application filed April 25, 1925. Serial No. 25,748.

My invention relates to improvement in automobile tires and is particularly adapted to provide a new tire wherein no air pressure is necessary to keep the same inflated, and the primary object is to provide a tire which can be easily assembled and attached to the rim of the vehicle wheel.

It is a feature of my invention to provide a particular means of fastening the tire casing to the rim in a manner so that it is held firmly at the bead of the tire yet without impairing the flexing of the side walls of the casing and permitting the cushioning portions within the tire to operate freely and readily.

My invention includes means for providing a cushion within the casing which has the tendency to distribute the flexing of the tire to a large portion of the same so that the tire is not called upon to take all of the shock of the irregularities of the road at the particular point of contact with the same. This is an important feature and my means of accomplishing this result are simple yet effective to the extent of being very similar to the resiliency of pneumatic tires.

It is also a feature of my invention to provide a tire which can be assembled onto the ordinary rim felly, which includes ring members extending within the casing and formed of an angular nature so as to grip the bead and firmly hold the tire casing to prevent creeping of the same on the rim. In a tire of this nature it is quite important that the same be held against movement about the rim after it is placed thereon.

The invention also includes a casing supporting channel ring upon which the casing is formed and secured and which ring forms a suitable bearing and support for the inner surface of the casing remote from the rim to provide a bearing means within the casing of a broad nature yet without affecting the flexing of the tire casing side walls in use. This inner supporting means, having the formation of a ring-like channel member, extends inwardly to form casing wall supporting means, which are provided with horizontally outwardly projecting flanges to form side wall supporting means, which will take up the strain on the side wall of the tire casing adjacent the tread. These outwardly projecting flanges are spaced away from the bead locking means, which are held within the casing, thus permitting the flexing of the casing side walls and cushion supported within the casing between the felly rim and the channel member sufficiently to take up the shock and provide a very resilient tire, yet providing sufficient rigidity for side thrust so that the tire will properly stand up in use.

The particular construction and formation, together with the features of my tire, will be more clearly set forth in the specification and claims.

Figures 2, 3:
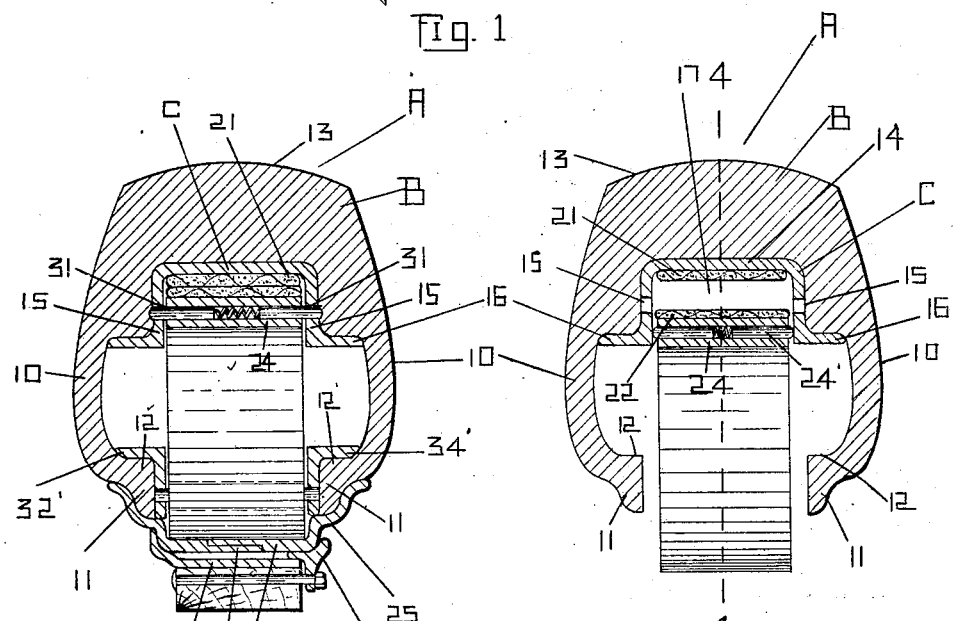
Figure 7:
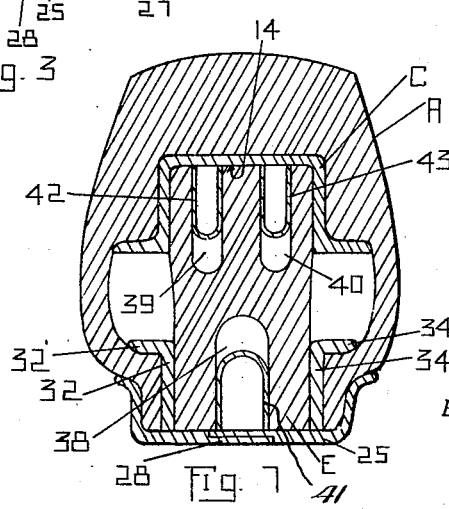

In the drawings forming part of this specification,

Fig. 1 is a sectional view illustrating a portion of my tire as it would appear on the wheel rim, Fig. 2 is a cross section through the same before it is attached to the rim, Fig. 3 is a cross section of the tire on the line 3—3 of Fig. 1, Fig. 4 is a section on the line 4—4 of Fig. 2, Fig. 5 illustrates my tire in the process of attaching to the rim, Fig. 6 illustrates my tire attached to a disk wheel, and Fig. 7 is a cross section similar to Fig. 3 illustrating a different formation of cushion within the casing.

My tire A is formed with a casing B which is provided with side walls 10 and a bead 11 which are very similar in appearance to the ordinary casing now in use for pneumatic tires and in fact the outer appearance is almost identical.

The casing B is provided with bead portions 11 which are formed with pronounced shoulders 12 as is illustrated clearly in the drawings.

The tread portion 13 of the casing B can be of any suitable nature, and in the formation of the casing B, the tread is mounted upon and is firmly fixed to the channel shaped reinforcing and supporting member seat. This member extends in the form of a ring-like channel member to which the casing is firmly secured in the manufacture of the same or in any other suitable maner so as to be approximately a part of the finished casing.

The channel member C has a bottom wall 14 and side walls 15. Projecting horizontally from the free end of the side walls 15 are annular flanges 16. This form of construction of the channel member C provides a supporting and reinforcing member in the casing of a very desirable nature. This construction forms an annular recess 17 within the member C, which is adapted to receive the cushion of my tire and to provide a very suitable supporting means for the same in which the cushion can operate freely and without bringing friction and undue wear against the side walls 10 of the tire A. This is important in my invention because heretofore tires have been made and used but the features incorporated in these tires have been very detrimental by reason of the friction on the side walls of the tire casing. Usually in other tires, the cushion bears directly against the side walls and wears the same at a point of the tire which is much weaker and thinner than any place else. It is my idea to overcome this weakness by spacing the cushion away from the side walls 10 of the casing, yet providing means for holding the cushion within the casing so that any side thrust against the casing in use is taken care of by the rigidity of the means for supporting the cushion and the cushion structure itself. Thus my construction provides a cushion supporting means within the casing which is held centrally between the side walls of the casing, such as 10, and thus permitting the casing to flex freely at the side walls 10 in proportion to the flexing of the cushion within the casing.

The cushion D, which I have illustrated in Figs. 1 to 6, is made up of a series of pliable cylindrical members 20, which are just a little shorter than the width of the recess 17, which is provided by the space between the side walls 15 of the channel member C so that the pliable cylinders 20 can operate freely within the space between the side walls 15.

The cylindrical members 20 are held in place within the casing by two endless belt members 21 and 22. The member 21 extends the space of about two of the cylinders 20 along the bottom 14 of the member C and then is held firmly against the sides of the two adjacent cylinders 20 by means of the idle rollers 23. The belt member 22 extends up between the adjacent cylinders covered by the portion of the belt 21, which extends along the bottom 14 of the member C and is held by the spring keys or rollers 24, which are provided with means for automatically locking them into place. Thus the rollers 24 are positioned between each pair of the rollers 20 and a portion of the belt 22 extends along and against the rim 25, which holds the tire A in place on the felly rim 26 by means of the lugs 27 in the ordinary well known manner.

The rim 25 may be divided centrally at 28 by the overlapping portions illustrated at this point, as is clearly shown in Fig. 3, and in Fig. 5 the parts are shown separated from each other.

In the assembly of the cushion D, the belt member 21 is laid within the casing B against the surface 14 of the member C. The rollers 20 are then placed against the belt 21 and at each of the points where the rollers 23 would come, the belt 21 extends between the adjacent pair of cylinders 20. The belts 21 and 22 are tied together at the points 29 and 30, respectively, which forms a loop into which the rollers 23 and 24 are held, respectively, which makes it easier to assemble the cushion D within the casing.

Fig. 4 illustrates the parts in the position they assume while being assembled. The roller 24 is provided with an axially positioned locking pin 24′, which is provided with a centrally positioned coil spring adapted to push the ends of the pin 24′ outwardly. In the course of assembling the cushion into the casing B when the roller 24 is in the position illustrated in Fig. 2, the pin 24′ is compressed against the walls 15 and as it is pushed inwardly into the channel 17, the ends of the pin come into position to the openings 31 in the side walls 15 of the member C. The spring between the ends of the pin 24′ cause the ends of the pin to snap into the openings 31 and thus lock the roller 24 in position.

The next operation in the assembly is to place one of the angular shaped rings 32 in position against the bead 11 as illustrated in Fig. 5. The rollers 23 are then placed in position with one end projecting into the opening 33 formed in the side wall of the ring 32. When all of the rollers 23 have been placed in this position, a ring 34, which is similar to the ring 32 and which is provided with openings 35 which are adapted to receive the end 36 of the roller 23, is placed in position so that the ends 36 of the rollers 23 engage in these openings 35 and thus positioning the ring 34 against the ends of the rollers 23 and adjacent the belts 21 and 22.

The other bead 11 of the casing B which is projecting outwardly in Fig. 5 is then brought against the ring 34 and the portion of the rim 25, which is illustrated separated from the other portion, is brought against the bead 11 and connected together at 28 with the other portion of the rim. This holds the rings 32 and 34 in position within the casing.

The angular shape of the rings 32 and 34 permit the same to engage against the shoulders 12 of the beads 11 and form a locking means with the sides of the rim 25, which engage the beads 11 so as to firmly lock the beads between the rings 32 and 34 and the rim 25 to hold the tire A against creeping on the rim 25 and to firmly lock the cushion D within the tire casing B.

In this construction, the cushion cylinders 20, which are formed of rubber or any other suitable pliable material, permit the casing B of the tire A to flex freely. In the flexing of the tire A, the cushions 20 give sufficiently to absorb the shock against the tire and the belts 21 and 22 transmit the shock from one roller to the other and thus carry the same considerably about the entire tire A. This provides a cushion D of a very flexible nature having the quality of distributing the shock about the tire and providing a very desirable cushion.

In the drawings, I have illustrated in Fig. 7, another form of cushion such as E. This cushion E is made of rubber of a spongy nature or any other suitable pliable material which will flex freely. The cushion E is formed with annular recesses 38, 39 and 40 in which annular shaped stiffening members 41, 42 and 43 are positioned within the openings 38, 39 and 40, respectively.

The stiffening member 41 is adapted to rest against the tire supporting rim 25 while the rings 42 and 43 rest against the inner surface of the wall 14 of the channel member C. Thus these members 41, 42 and 43 provide a stiffening means within the body of the cushion E to prevent the same from being too flexible and thus provide the necessary rigidity to the same. In this construction the tire A is free to flex the amount between the flanges 16 and the flanges 32' and 34' of the members 32 and 34; side walls 10 being free to flex and to limit the space between these members. Should the tire A flex to such an amount, the flanges 16 and the flanges 32' and 34' can contact with each other to form flat contacting surfaces, which would only contact momentarily while the tire A struck a sharp bump and which is important in the construction of my tire. It is therefore evident that the flanges 16 and the flanges 32' and 34' extend approximately parallel to each other at all times and are ordinarily spaced apart by the cushion within the casing B of my tire.

Fig. 6 illustrates a portion of a disk wheel F which has a clamping rim member 45 which is adapted to clamp the beads 11 of the tire A against the angular members 32 and 34 to hold the same firmly to the wheel rim.

It is evident that any suitable form of cushion can be used in my tire A but it is essential to bear in mind that the channel member C ordinarily is attached to the casing B at the time the same is made, or in other words, the casing B is formed about the channel member C so that the same is held firmly to the casing B. It is evident that the casing B can be formed of the shape illustrated and the member C inserted after the same is made up if it is so desired. It is important, however, that the beads 11 be formed with shoulder portions 12 or similar shoulders so that clamping rings similar to 32 and 34 can be employed to grip the inner shoulder formation of the beads 11, then when these parts are in position the cushion can rest against the inner surface of the tire supporting rim such as 25 and thus the tire A is held firmly thereon and clamped in a manner so that it cannot creep about the rim.

In accordance with the patent statutes, I have described the principles of operation of my tire and while I have illustrated a particular formation of my tire in the drawings, I desire to have it understood that these drawings are only illustrative and that the invention can be applied to uses other than those set forth in the scope of the following claims.

What I claim is:

1. A tire including a casing, an annular channel member fixed within said casing at the tread portion of said casing, a cushion adapted to form the core in said casing, bearings in said channel from which said cushion is supported and means for securing said casing to a wheel rim.

2. A tire having a casing, a channel shaped bearing member adapted to support the inner surface of said casing at the tread, a cushion fitting into said channel member, straps supporting said cushion and resting against the wheel rim to which said tire is secured.

3. A tire having a casing, a tread supporting angular member secured within a channel formed in said casing, a cushion having part of its cushioning portion extending into said supporting member and means for locking said casing at the bead to a wheel rim.

4. A tire comprising a casing, an annular angular member for supporting the tread held within said casing, securing beads formed and extending from the side walls of said casing and angular rings positioned entirely within said casing adapted to clamp said beads to hold them against the holding flanges of a wheel rim.

5. A resilient tire including a casing member, a harder than pliable rubber ring adapted to form a bearing surface within the tread portion of said casing to support the tread of the tire, a cushion including cylinders interposed between said ring and the rim of the wheel supporting said casing and means for distributing impacts to various portions of said cushion.

6. A resilient tire having a hollow casing member of pliable rubber, a harder than pliable rubber bearing surface member within the inner surface of said casing to support the tread portion of said casing, and harder than pliable rubber right angular ring members adapted to clamp against the right angular shoulders of the beads of the side walls of said casing to hold the same from creeping on the rim.

7. A tire including a casing, a hard bearing surface formed within said casing at the inner surface of the tread, a pair of bead clamping rings and a rim having separable portions adapted to engage against the outer surfaces of the beads of said tire to clamp the same against said clamping rings and cushion means within said casing adapted to hold said clamping rings spaced apart.

8. A tire including a casing, angular shaped bead portions formed on said casing, inwardly positioned shoulders formed on said beads and a pair of removable right angular locking rings adapted to engage said shoulders of said beads in a manner to cause one side of said rings parallel with a supporting rim face to clamp the same firmly against said rim face.

9. A tire including a casing, a channel shaped ring-like member positioned within said casing, a series of pliable cylinders and a pair of endless belts extending on either side of said cylinders to alternately divide the same into pairs adjacent each other, means for clamping said cylinders and belts in said casing and means for clamping said casing to a supporting rim to hold the same firmly secured thereto.

10. A tire including a casing formed of flexible material, a channel shaped ring held in said casing, shouldered bead rims formed on said casing to provide inner and outer shoulders, a pair of clamping rings adapted to engage said inner shoulders and a divided supporting rim adapted to engage the outer shoulders to clamp the shouldered beads firmly to hold said tire on said rim and a cushion means supported between said locking rings and said channel ring and spacing the inner clamping rings.

11. A tire including a flexible casing, an annular channel shaped ring positioned within said casing at the base of the tread of said tire adapted to fit a groove in said casing to form an annular bearing surface therein, clamping rings adapted to form internal clamping rings for the beads of said tire casing and cushioning means interposed between said channel bearing surface ring and the inner surface of a supporting ring whereby the cushioning means is held centrally within said casing and spaced away from the side walls thereof to permit the side walls to flex freely without contacting with said cushion.

12. A tire including a casing, an annular bearing surface member of a material harder than pliable rubber positioned within said casing along the entire inner surface at the base of the tread of the same and having sides adapted to form means for holding cushioning means centrally within said casing to prevent the same from contacting with the side walls of the same whereby the side walls of said tire can flex freely with the flexing of the cushion held centrally within said casing by said annular bearing ring.

GEORGE H. YOUNG.